US008069376B2

(12) United States Patent
Monferrer et al.

(10) Patent No.: US 8,069,376 B2
(45) Date of Patent: Nov. 29, 2011

(54) ON-LINE TESTING FOR DECODE LOGIC

(75) Inventors: Pedro Chaparro Monferrer, Barcelona (ES); Jaume Abella, Barcelona (ES); Xavier Vera, Barcelona (ES); Javier Carretero Casado, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 226 days.

(21) Appl. No.: 12/469,605

(22) Filed: May 20, 2009

(65) Prior Publication Data
US 2010/0299507 A1    Nov. 25, 2010

(51) Int. Cl.
*G06F 11/00*    (2006.01)
(52) U.S. Cl. .......................................... 714/49; 714/31
(58) Field of Classification Search ............... 714/49, 714/50, 52, 30–32, 733, 734
See application file for complete search history.

(56) References Cited

U.S. PATENT DOCUMENTS

| 6,012,155 A * | 1/2000 | Beausang et al. ............. 714/727 |
| 6,351,802 B1 * | 2/2002 | Sheaffer ........................ 712/215 |
| 6,519,733 B1 * | 2/2003 | Har et al. ....................... 714/758 |

OTHER PUBLICATIONS

C. Metra et al., Function-Inherent Code Checking: A New Low Cost On-Line Testing Approach for High Performance Microprocessor Control Logic, 13th European Test Symposium, May 25-29, 2008, pp. 171-176, IEEE Computer Society, Washington, DC.

* cited by examiner

*Primary Examiner* — Dieu-Minh Le
(74) *Attorney, Agent, or Firm* — Blakely, Sokoloff, Taylor & Zafman LLP

(57) ABSTRACT

Methods and apparatuses for on-line testing for decode logic are presented. In one embodiment, a processor comprises translation logic to decode an instruction to micro-operations and extraction logic to determine first information about numbers of occurrences of fields in the micro-operations. In one embodiment, the processor further comprises verification logic to indicate whether the decoding results of the instruction are accurate based at least on the first information.

20 Claims, 6 Drawing Sheets

ON-LINE TESTING FOR DECODE LOGIC

FIELD OF THE INVENTION

Embodiments of the invention relate to computer systems; more particularly, embodiments of the invention relate to decoding of computer instructions.

BACKGROUND OF THE INVENTION

Computers process information by executing a sequence of instructions, which are supplied from a computer program written in a particular format. Most computer programs are written in high level languages which are not directly executable by the computer processor. In order to run these programs, a compiler is used to translate the higher level commands into instructions (or macroinstructions) which a microprocessor can operate on. When a program is executed, instructions of the program are sent to a decoder of a microprocessor, where an instruction is decoded into one or more micro-operations which are executable by execution units in the microprocessor.

In-the-field failures of a microprocessor may happen because of various reasons, such as, for example, degradation of material, process variations, soft errors, design errors, etc. Errors that happen during decoding of instructions may induce failures that are difficult to recover from and consequently result in system failures.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

Figure 1:
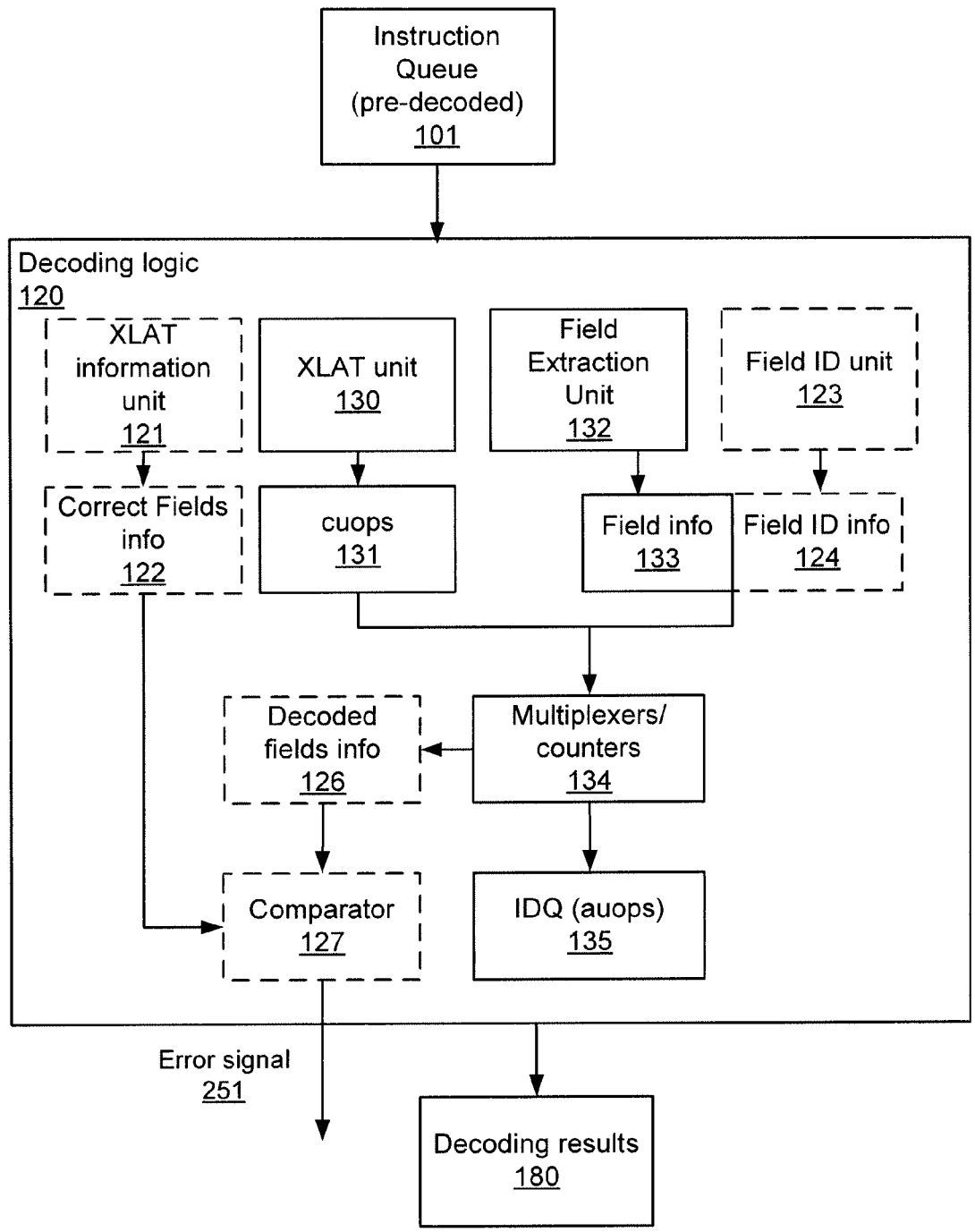
FIG. 1 is a block diagram of decoding and verification logic in accordance with an embodiment of the invention.

Methods and apparatuses for on-line testing for decode logic are presented. In one embodiment, a processor comprises translation logic to decode an instruction to micro-operations and extraction logic to determine information about instruction fields to be used by the micro-operations. In one embodiment, information extracted includes numbers of occurrences of the fields used by the micro-operations. In one embodiment, the processor further comprises verification logic to indicate whether the decoding results of the instruction are accurate based at least on the extracted information.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of present invention also relate to apparatuses for performing the operations herein. Some apparatuses may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms and displays presented herein are not limited to any particular computer or other apparatus. Various systems may be used with programs in accordance with the teachings herein, or it may prove convenient to construct more specialized apparatus to perform the required method steps. The required structure for a variety of these systems will appear from the description below. In addition, embodiments of the present invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

The methods and apparatuses described herein are for online-testing for decode logic. Specifically, online-testing for decode logic is primarily discussed in reference to multi-core processor computer systems. However, the methods and apparatuses for online-testing for decode logic are not so limited, as they may be implemented on or in association with any integrated circuit device or system, such as cell phones, personal digital assistants, embedded controllers, mobile platforms, desktop platforms, and server platforms, as well as in conjunction with other resources, such as hardware/software threads, that utilize decode logic.

Overview

FIG. 1 is a block diagram of decoding and verification logic in accordance with an embodiment of the invention. Many related components such as buses and peripherals have not been shown to avoid obscuring the invention. Referring to FIG. 1, in one embodiment, decoding logic 120 includes translate information unit 121 (XLAT information unit 121), translate unit 130 (XLAT 130), field extraction unit 132, field identifiers unit 123, multiplexers/counters 134, instruction decoded queue 135, and comparator 127. In one embodiment, XLAT information unit 121, field identifiers unit 123, and comparator 127 are referred to herein as verification logic.

In one embodiment, decoding logic 120 receives instructions (macro-instructions) from instruction queue 101 and generates decoding results 180 which will be executed by execution units of a processor. In one embodiment, instructions from instruction queue 101 are pre-decoded.

In one embodiment, decoding logic 120 includes an aliasing system, in which the opcode of an instruction is decoded into control micro-operations (Cuops), and fields from the instruction are extracted and stored in alias registers. With the aliasing system, fields extracted from instruction are indirectly referenced and incorporated into aliased micro-operations (Auops). In one embodiment, decoding logic 120 issues aliased micro-operations (Auops).

In one embodiment, XLAT 130 decodes an opcode into control micro-operations (Cuops 131). In one embodiment, a Cuop includes a template for a particular micro-operation and control information (control fields) that defines aliasing (indirect data access) required by that Cuop. In one embodiment, XLAT 130 includes circuitry to produce one or more Cuops per instruction. In other embodiments, decoding logic 120 comprises more than one XLAT unit (not shown) to generate Cuops in parallel.

In one embodiment, an opcode comprises one, two, or three bytes. In one embodiment, the third byte is a "mod r/m" byte. In one embodiment, XLAT 130 receives predetermined bits from these three bytes. If some of the supplied bits are not necessary to decode a current instruction, then the bits will be ignored. For example if only the first byte is an opcode byte, the second and third bytes are ignored or are considered as "don't cares" by XLAT 130. In one embodiment, XLAT 130 also receives other information, such as, for example, decoded prefix information, a lock indicator, and an operand size prefix. In one embodiment, Cuop registers (not shown) store one or more Cuops 131.

In one embodiment, field extraction unit 132 receives some bits from an instruction. Results from field extraction unit 132 are assembled with one or more Cuops to generate aliased micro-operations (Auop). Field extraction unit 132 will be described in further detail below.

In one embodiment, XLAT 130 includes a programmable logic array (PLA) which is a programmable circuit. In one embodiment, a PLA is implemented as combinational logic. In one embodiment, XLAT 130 is implemented as static combinational logic. In one embodiment, decoding logic 120 includes one or more XLAT 130 and a microcode sequencing unit (not shown) including a microcode ROM (not shown) having micro-operation sequences stored therein. The microcode sequencing unit includes a control circuit, responsive to a microcode instruction, to provide control signal to select one of the Cuops.

In one embodiment, XLAT Information unit 121 provides verification pattern. XLAT information 121 receives and processes original instruction bytes in parallel to XLAT 130. XLAT information 121 identifies an instruction and generates verification pattern based on a lookup table. In one embodiment, XLAT information unit 121 includes a table stored in non-volatile memory, the table contains verification pattern corresponding to different instructions and is accessible based on indexes.

In one embodiment, verification pattern of an instruction includes a set of numbers each corresponding to a field. In one embodiment, each of the number is indicative of the expected number of occurrences of a field if the decoding results are accurate. In one embodiment, verification pattern of an instruction includes a signature. The signature is generated based on occurrences of fields of decoding results of the instruction, by using a hashing function.

Field Extraction

In one embodiment, field extraction unit 132 includes circuits that perform the following functions: detection of illegal operand usage, decoding of prefix bytes (if not previously decoded), and calculation of actual instruction length.

In one embodiment, field extractor unit 132 extracts all aliasable information from an instruction and generates field information 133. In one embodiment, field extraction unit 132 performs operations in parallel with XLAT 130. In one embodiment, field extractor 132 operates in serial following operations of XLAT 130. In one embodiment, decoding logic 120 uses a direct approach which does not requires an aliasing system.

In one embodiment, examples of fields (for extraction) include a source field (SRC), a destination field (DEST), a size field (SIZE), etc.

In one embodiment, field identifier unit 123 stores information about field identifiers corresponding to fields. In one embodiment, field identifier unit 123 produces field identifier 124 associated to a corresponding field. For example, field identifier unit 123 associates a field identifier (e.g., a binary code) to every field extracted from an instruction. For example, SRC is associated with a code "000", DEST is associated with a code "001", and SIZE is identified with a code "010". In one embodiment, other examples of fields include logical registers, address size, data size, stack address and stack data size, immediate and displacement data, branch information, and portions of various predetermined opcode bits.

In one embodiment, field identifier 124 and field information 133 are sent to multiplexers/counters 134. Multiplexers/counters 134 selectively combine Cuops with field information 133 to assemble Auops.

In one embodiment, multiplexers/counters 134 generate Auops by using Cuops as templates to be filled with information from the field information 133. In one embodiment, multiplexers/counters 134 receive control signal from Cuops 131. In one embodiment, Auops are stored in IDQ 135 before decoding logic 120 issues Aoups as decoding results 180.

Field Count

In one embodiment, multiplexers/counters 134 include a plurality of counters. Each of the counters is associated with a field identifier. The value of a counter increases if the associated field exists in field identifier information 124. In one embodiment, multiplexers/counters 134 comprise 14 counters to store a number of occurrences of each of the 14 different fields.

In one embodiment, multiplexers/counters 134 insert field information 133 into an Auop while multiplexers/counters 134 update counter values based on identifier information 124 that corresponds to field information 133. In one embodiment, field identifier information 124 includes control signal to select a counter for increasing the value of the counter.

In one embodiment, counters are reset every time multiplexers/counters 134 receive a Cuop indicative of begin of macro-instruction (BOM). On the other hand, multiplexers/counters 134 sends decoded field information 126 to comparator 127 if an end of macro-instruction (EOM) is detected.

In one embodiment, decoded field information 126 includes all counters' values of multiplexers/counters 134. In one embodiment, decoded field information 126 further includes information for associating each counter value to a field.

In one embodiment, comparator 127 compares decoded field information 126 with correct field information 122 retrieved from the XLAT information unit 121. In one embodiment, if any of the number of occurrences of a field in decoded field information 126 is different from the number of occurrences of the same field in correct field information 122, comparator 127 determines that an error has occurred in decoding logic 120.

In one embodiment, if the number of occurrences of each field in decoded field information 126 is similar to the corresponding value in correct field information 122, comparator 127 determines that no error occurs in decoding logic 120.

In one embodiment, comparator 127 generates error signal 251 based on the result of comparison.

In one embodiment, comparator 127 is not able to detect some errors if two instructions results in same numbers of occurrences of all fields. In one embodiment, a probability of a decoding error happens and the error is undetectable because of decoding results are similar is very low such that the probability is negligible.

In one embodiment, test functions (fault detection, diagnosis, error correction, repair, etc.) that are applied concurrently while a system is able to continue its intended function are referred to herein as on-line testing. In one embodiment, on-line testing includes design of concurrent error checking subsystems that perform self-checking and fail-safe systems that continue to function correctly even after an error occurs. In one embodiment, on-line testing also include systems that perform reliability monitoring, self-test, and fault tolerant functions. In one embodiment, decoding logic 120 is operable to generate error signal 251 using the on-line verification logic as describe with respect to FIG. 1.

In one embodiment, decoding logic 120 includes a duplicate of field extraction unit 132 and a duplicate of field identifier logic 123 to improve error coverage.

In one embodiment, some instructions results in a lot of micro-operations (e.g., more than 100). The number of occurrences of a field in those micro-operations is larger than the upper bound of a counter. In one embodiment, comparator 127 ignores an instruction that results in a large number of micro-operations. In one embodiment, comparator 127 ignores an instruction that results in a non-deterministic number of micro-operations.

In one embodiment, in order to reduce power consumption, a counter with a smaller bit width is used. In one embodiment, the value of a counter saturates if the number of occurrences of a field is larger than the upper bound of the counter.

In one embodiment, a hashing function is used to hash the information of occurrences of fields (field information 133). In one embodiment, the same hashing function is used to generate correct filed information 122 stored in XLAT information unit 121. In one embodiment, by using a hashing function, the number of counters required in multiplexers/counters 134 is reduced and the memory size of XLAT information unit 121 is reduced. In one embodiment, XLAT information unit 121 stores signatures corresponding to instructions processed by decoding logic 120.

In one embodiment, instructions coming from instruction queue 101 are pre-decoded (i.e., aligned). In one embodiment, a pre-decode phase is required in decoding logic 120 if the instructions from instruction queue 101 are not aligned.

In one embodiment, a processor is designed to comply with a specified "failures in time" (FIT) rate. The voltage of the processor is reduced to save power usage. In one embodiment, verification logic verifies that decode logic operates correctly even if the operating voltage has been lowered. In one embodiment, verification logic protects the operation of an instruction decoder that decodes Intel64 instructions to micro-operations.

In one embodiment, correction mechanism is initiated in response to error signal 251. In one embodiment, recovery of an error is performed by re-fetching instructions and recovering to a consistent state. As a result, in-field-failures are reduced, FIT rate is also lowered. In one embodiment, the processor relies on protection mechanism as described with respect to FIG. 1 to reduce failures caused by decoding errors.

In one embodiment, operations of control logic (e.g., decoding logic 120) and the logic elements implemented (i.e., decoders, word-lines, etc.) are protected against in-the-field failures (e.g., degradation, variations, soft errors, inherent design errors, etc.) by using on-line testing with respect to FIG. 1. In one embodiment, arithmetic codes such as parity or ECC codes are only effective at protecting contents of memory structures. In one embodiment, an error in the decoding operation induces failures that are neither avoidable by arithmetic codes nor by checking the operation of later stages of the pipeline.

Figure 2:
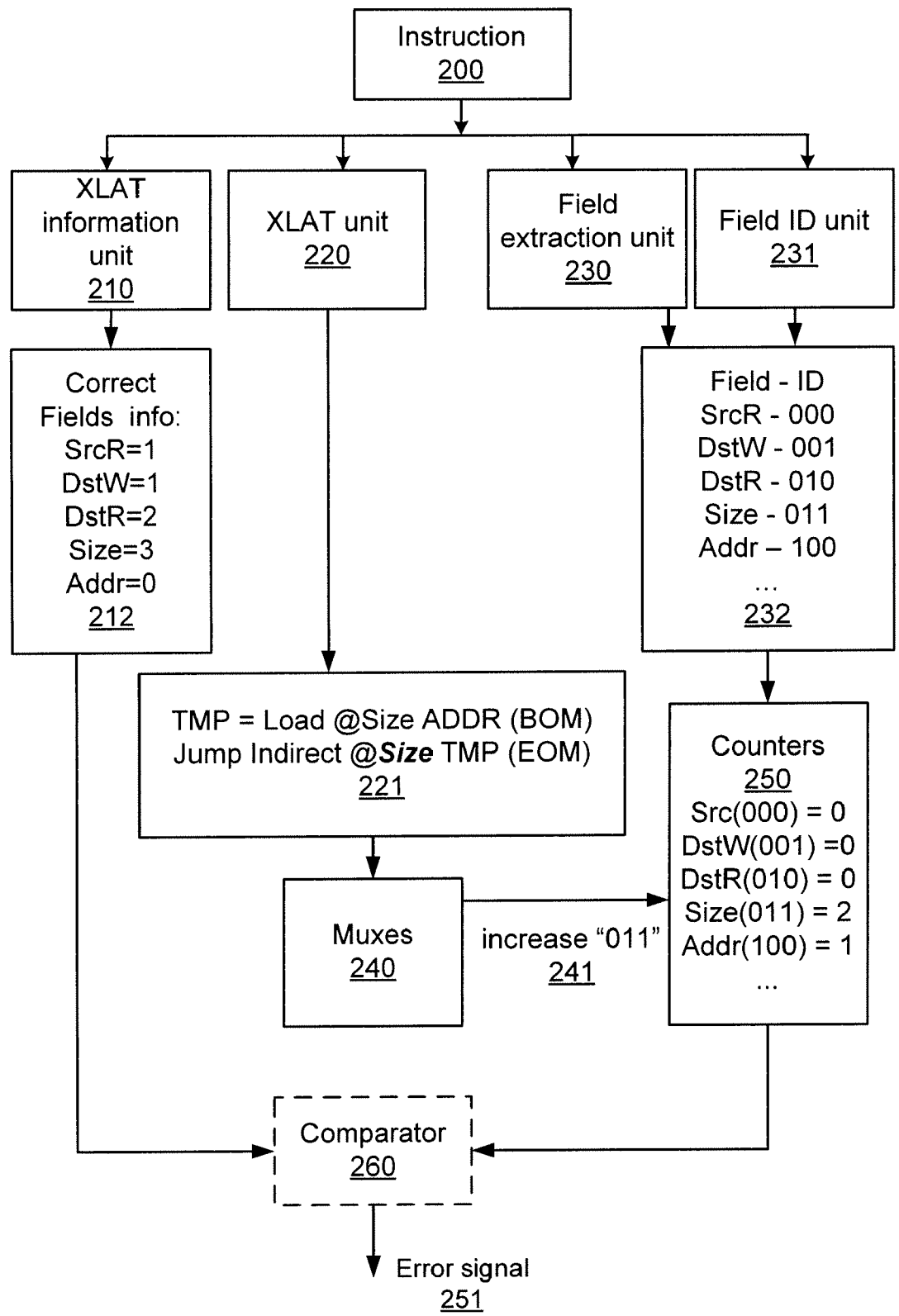
FIG. 2 shows an exemplary use of decoding and verification logic in accordance with an embodiment of the invention.

FIG. 2 shows an exemplary use of decoding and verification logic in accordance with an embodiment of the invention.

In one embodiment, instruction 200 is a PUSH instruction to be processed by decoding logic. In one embodiment, XLAT information unit 210, XLAT unit 220, field extraction unit 230, and field identifier unit 231 receive opcode bytes of instruction 200.

In one embodiment, a PUSH instruction comprises two micro-operations: (1) "Store" @Size (@DstR, @Size), SrcR (BOM); and (2) @DstW="Compute Eff Address" (@DstR, @Size) (EOM).

In one embodiment, based on opcode bytes of instruction 200, XLAT information unit 210 retrieves correct field information 212 comprising, for example, SRC Read field (the number of occurrences=1), DEST Write field (the number of occurrences=1), DEST Read field (the number of occurrences=2), SIZE field (the number of occurrences=3), and ADDR field (the number of occurrences=0).

In one embodiment, for the purpose of this example, XLAT unit 220 generates wrong micro-operations (e.g., micro-operations of another instruction, such as a JUMP instruction) because an error happens. In one embodiment, micro-operations of a JUMP instruction comprises: (1) TMP="Load" @Size ADDR (BOM); and (2) "Jump Indirect" @Size TMP (EOM). In one embodiment, field extraction unit 230 extract fields from instruction 200 in conjunction with field identifier unit 231 which provides association of a field identifier for each field (as shown in 232).

In one embodiment, multiplexers 240, based on cuops 221 and field identifier information 232, increases the value of a counter corresponding to a field for each occurrence of the field in the faulty micro-operation. For example, multiplexers 240 detects an occurrence of SIZE field (shown with bold and italic in 212). SIZE field is associated with field identifier "011" (as shown in 232). A counter in counters 250 which is associated with "011" will be incremented.

In one embodiment, comparator 260 compares values from counters 250 with correct field information 212. In one embodiment, comparator 260 generates error signal 251 which indicates that an error has occurred if the values from counters 250 do not match correct field information 212. In one embodiment, comparator 260 generates error signal 251 which indicate that no error has occurred if the values from counter 250 match correct field information 212.

In other embodiment, information about occurrences of each field is recorded by using hashing logic. In one embodiment, the hashing logic perform simple XOR functions. In one embodiment, the hashing logic performs an XOR operation between a field identifier and a current signature. For example, the current signature is "000" after a reset, multiplexers 240 detects an occurrence of SIZE (011") and an occurrence of ADDR ("100") from a micro-operation (i.e., TMP="Load" @Size ADDR). In one embodiment, hashing logic performs an operation of "000" XOR "011" XOR "111" and stores the result of the operation as the current signature.

In one embodiment, to improve error coverage, hashing logic rotates bits of an identifier before performing the XOR operation.

Figure 3:
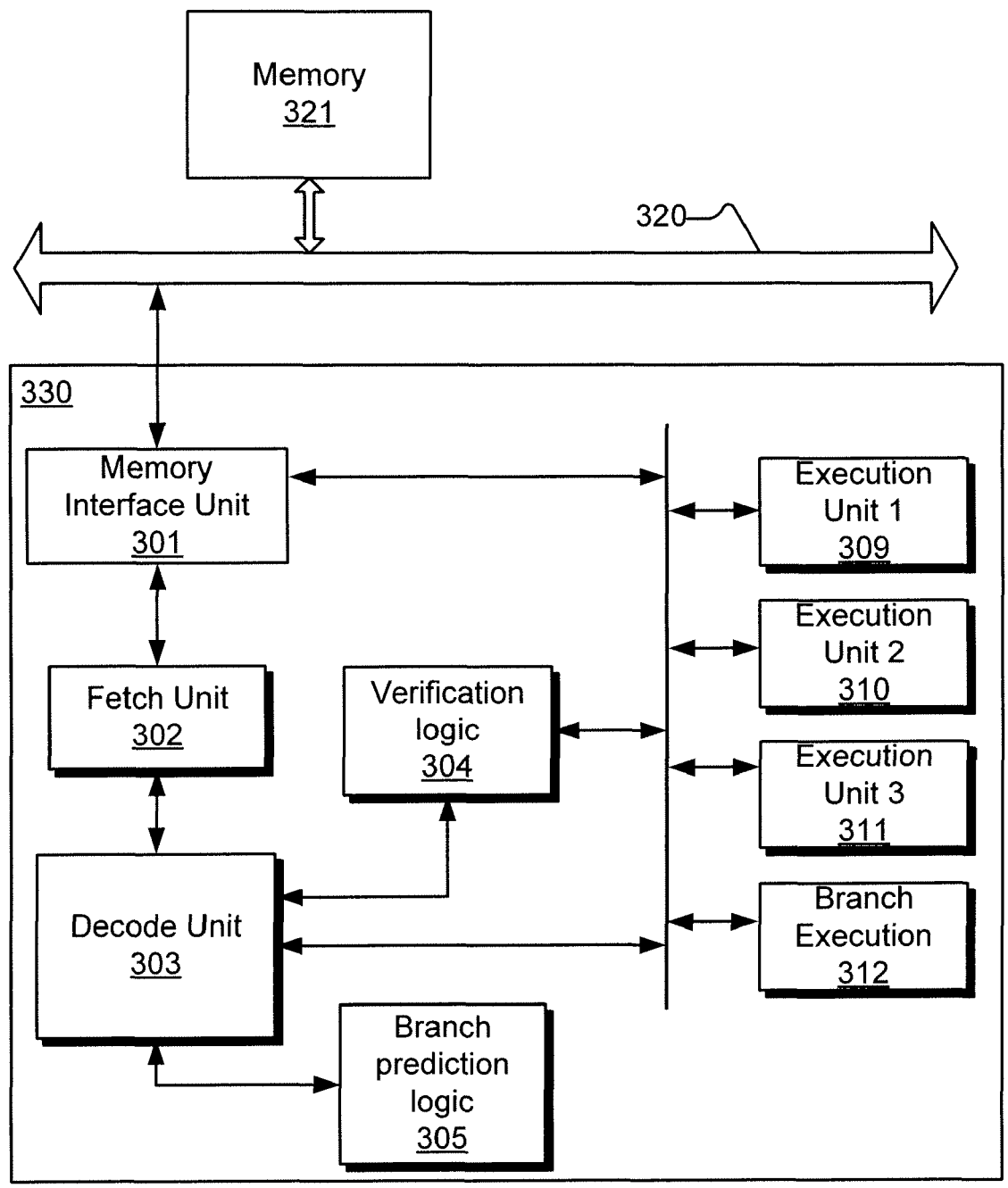
FIG. 3 is a block diagram of an embodiment of a computer system.

FIG. 3 is a block diagram illustrating one embodiment of a computer system. In one embodiment, the computer system includes processor 330, memory 321, and computer bus 320. Processor 330 further includes memory interface unit 301, fetch unit 302, decode unit 303, verification logic 304, execution units 309-311, branch execution unit 312, and branch prediction logic 305. In one embodiment, verification logic 304 is part of decode unit 303.

In one embodiment, processor 330 interfaces with memory 321, providing non-permanent storage of data and program instructions. Memory interface unit 301 transfers data and instructions between memory 321 and processor 330. Fetch unit 302 obtains particular instructions from memory interface unit 301. Decode unit 303 determines the type of an instruction and divides the instruction into one or more micro-operations. Execution units 309-311 execute micro-ops. Branch execution unit 312 executes micro-operations associated with branch instructions. Branch prediction logic 305 provides predictions and target addresses of branch instructions if available.

In one embodiment, verification logic 304 comprises XLAT information for use to verify decoding results of an instruction from decode unit 303. In one embodiment, verification logic 304 comprises XLAT information unit 210, field identifier unit 231, and counters 250 with respect to FIG. 2. While in this exemplary embodiment verification logic 304 is a distinct unit implemented in hardware, it should be appreciated that alternate embodiments may involve other implementations of verification logic 304. For example, the functions of verification logic 304 may be distributed among different units within a processor.

Figure 4:
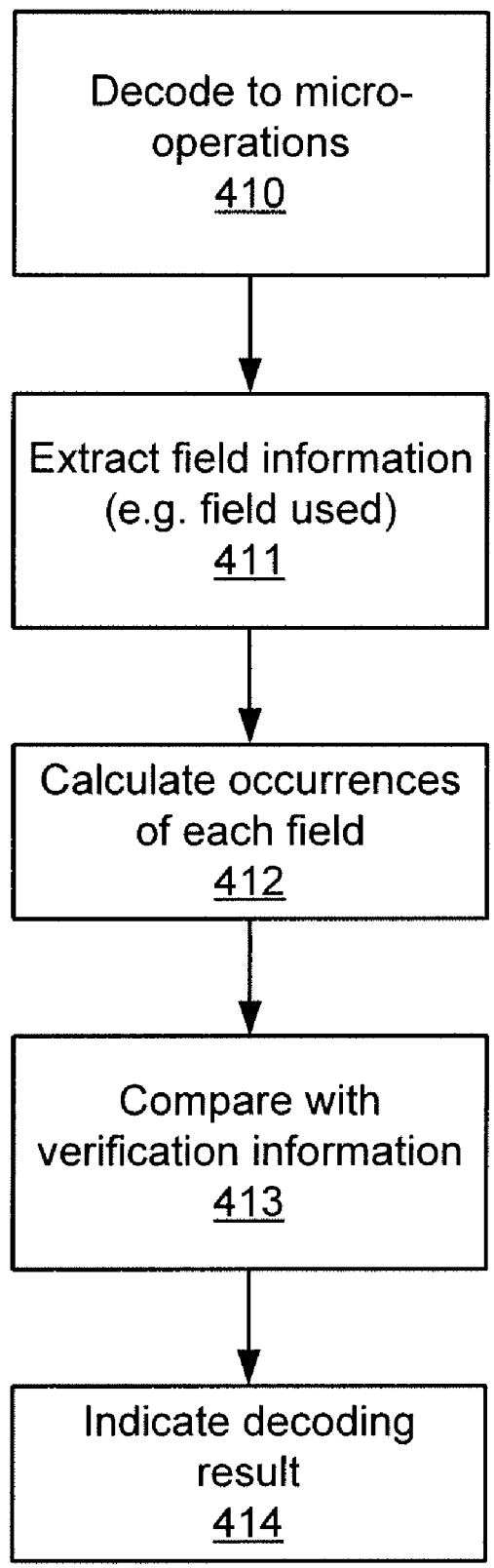
FIG. 4 is a flow diagram of one embodiment of a process to verify decoding results of an instruction.

FIG. 4 is a flow diagram of one embodiment of a process to verify decoding results of an instruction.

The process is performed by processing logic that may comprise hardware (circuitry, dedicated logic, etc.), software (such as is run on a general purpose computer system or a dedicated machine), or a combination of both. In one embodiment, the process is performed in conjunction with decoding logic with respect to FIG. 1. In one embodiment, the process is performed by a computer system with respect to FIG. 5.

Referring to FIG. 4, the process begins by processing logic decodes an instruction to micro-operations (process block 410). In one embodiment, processing logic extracts field information, for examples, occurrences of each field in the micro-operations (process block 411).

In one embodiment, processing logic determines a set of numbers, wherein each number is indicative of the number of occurrences of a field in micro-operations decoded (process block 412).

In one embodiment, processing logic compares the numbers with verification information (process block 413). In one embodiment, the verification information comprises correct values (expected values) of occurrences of different fields in micro-operations with respect to an instruction.

In one embodiment, processing logic determines whether the result of comparison indicates that an error has happened during a decoding process (process block 414). In one embodiment, processing logic generates an error signal (indicating that an error has occurred) if at least one number of occurrences of a field (in decoded micro-operations) is not equal to the expected value based on the verification information.

In one embodiment, processing logic performs one or more operations in parallel. For example, processing logic is operable to retrieve verification information while field information is being extracted. In one embodiment, processing logic performs one or more operations in serial order.

Embodiments of the invention may be implemented in a variety of electronic devices and logic circuits. Furthermore, devices or circuits that include embodiments of the invention may be included within a variety of computer systems. Embodiments of the invention may also be included in other computer system topologies and architectures.

Figure 5:
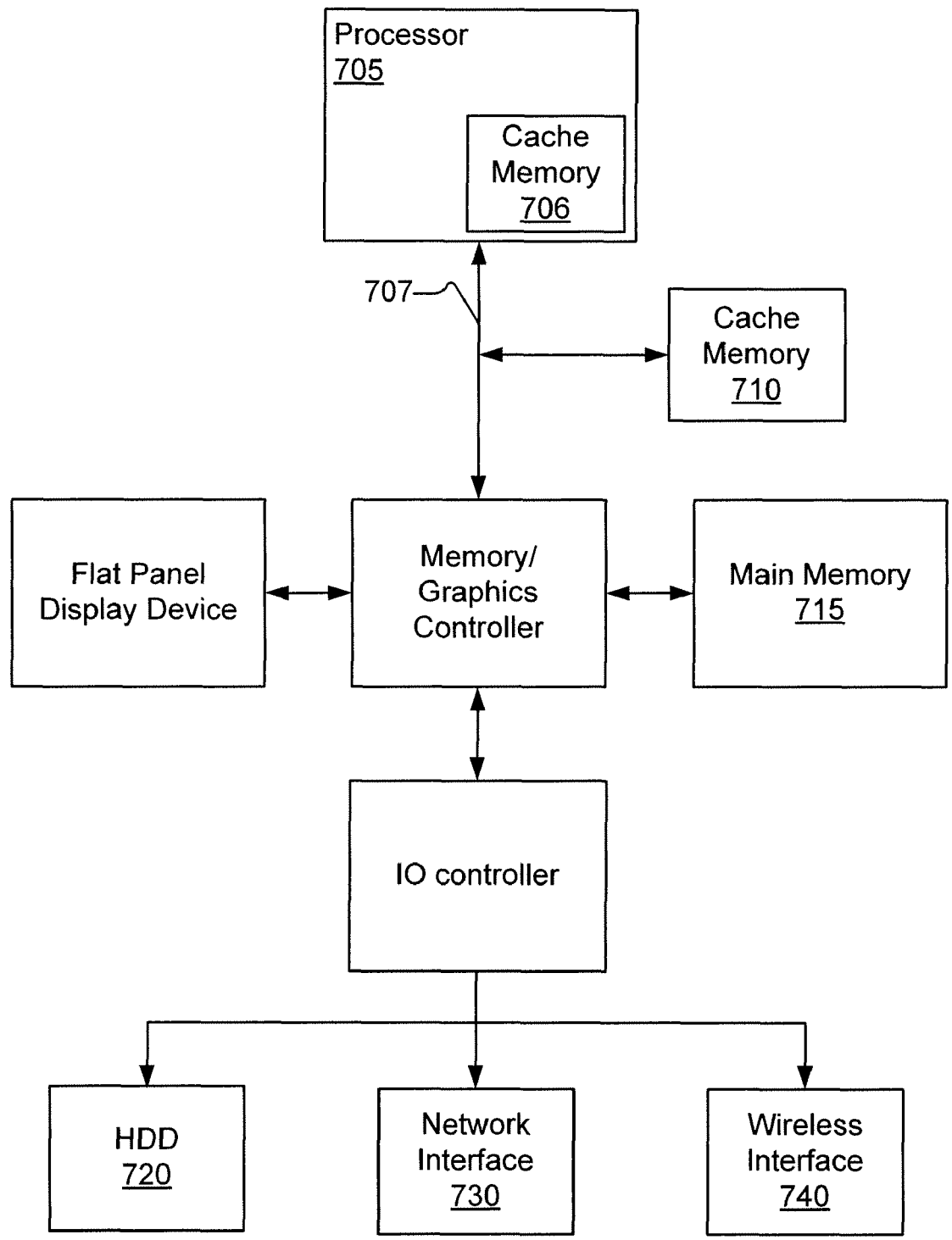
FIG. 5 illustrates a computer system for use with one embodiment of the present invention.

FIG. 5, for example, illustrates a computer system in conjunction with one embodiment of the invention. Processor 705 accesses data from level 1 (L1) cache memory 706, level 2 (L2) cache memory 710, and main memory 715. In other embodiments of the invention, cache memory 706 may be a multi-level cache memory comprise of an L1 cache together with other memory such as an L2 cache within a computer system memory hierarchy and cache memory 710 are the subsequent lower level cache memory such as an L3 cache or more multi-level cache. Furthermore, in other embodiments, the computer system may have cache memory 710 as a shared cache for more than one processor core.

Processor 705 may have any number of processing cores. Other embodiments of the invention, however, may be implemented within other devices within the system or distributed throughout the system in hardware, software, or some combination thereof.

Main memory 715 may be implemented in various memory sources, such as dynamic random-access memory (DRAM), hard disk drive (HDD) 720, solid state disk 725 based on NVRAM technology, or a memory source located remotely from the computer system via network interface 730 or via wireless interface 740 containing various storage devices and technologies. The cache memory may be located either within the processor or in close proximity to the processor, such as on the processor's local bus 707. Furthermore, the cache memory may contain relatively fast memory cells, such as a six-transistor (6T) cell, or other memory cell of approximately equal or faster access speed.

Other embodiments of the invention, however, may exist in other circuits, logic units, or devices within the system of FIG. 5. Furthermore, in other embodiments of the invention may be distributed throughout several circuits, logic units, or devices illustrated in FIG. 5.

Figure 6:
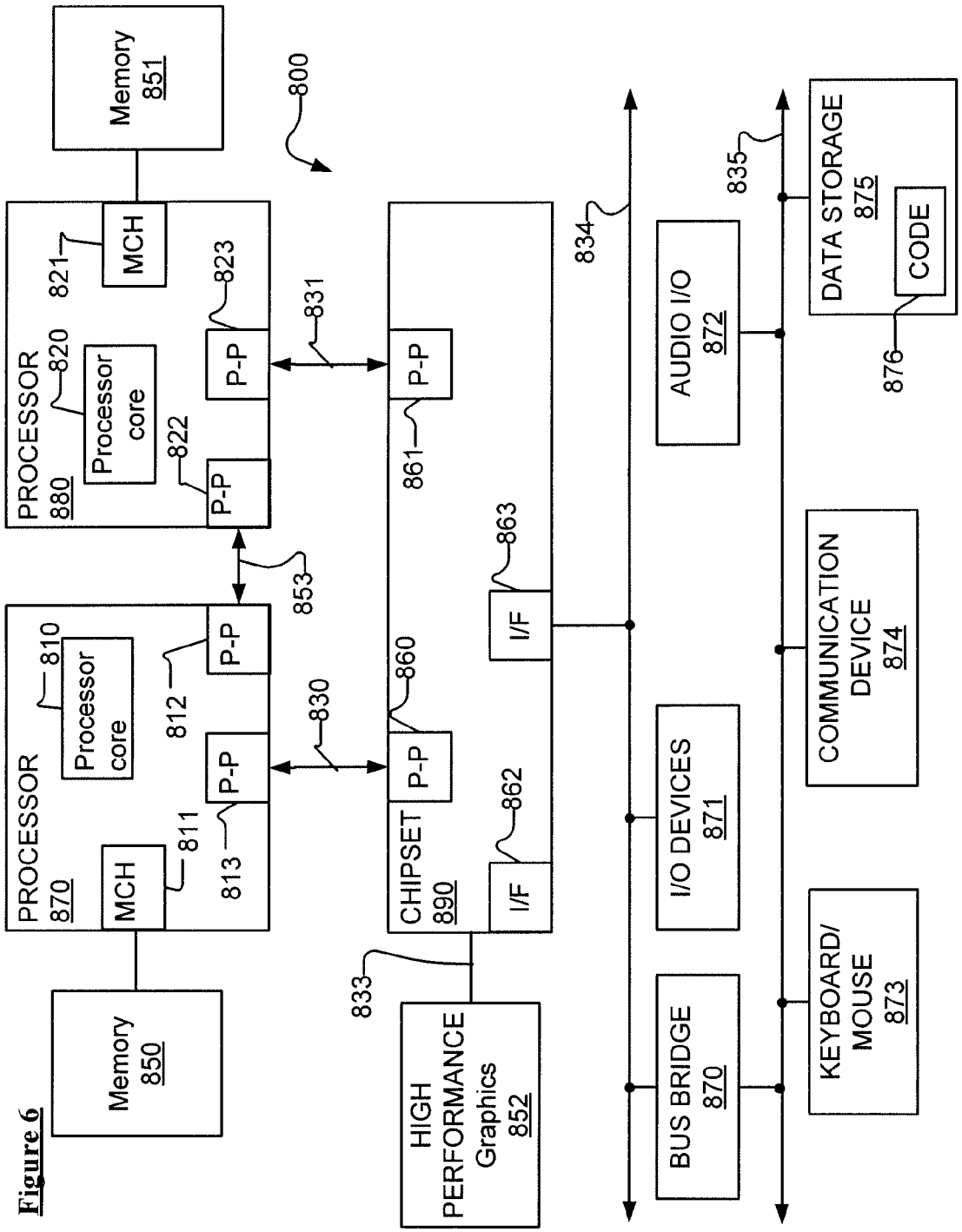
FIG. 6 illustrates a point-to-point computer system for use with one embodiment of the invention.

Similarly, at least one embodiment may be implemented within a point-to-point computer system. FIG. 6, for example, illustrates a computer system that is arranged in a point-to-point (PtP) configuration. In particular, FIG. 6 shows a system where processors, memory, and input/output devices are interconnected by a number of point-to-point interfaces.

The system of FIG. 6 may also include several processors, of which only two, processors 870, 880 are shown for clarity. Processors 870, 880 may each include a local memory controller hub (MCH) 811, 821 to connect with memory 850, 851. Processors 870, 880 may exchange data via a point-to-point (PtP) interface 853 using PtP interface circuits 812, 822. Processors 870, 880 may each exchange data with a chipset 890 via individual PtP interfaces 830, 831 using point to point interface circuits 813, 823, 860, 861. Chipset 890 may also exchange data with a high-performance graphics circuit 852 via a high-performance graphics interface 862. Embodiments of the invention may be coupled to computer bus (834 or 835), or within chipset 890, or coupled to data storage 875, or coupled to memory 850 of FIG. 6.

Other embodiments of the invention, however, may exist in other circuits, logic units, or devices within the system of FIG. 6. Furthermore, in other embodiments of the invention may be distributed throughout several circuits, logic units, or devices illustrated in FIG. 6.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chipset components, programmable logic arrays (PLA), memory chips, network chips, or the like. Moreover, it should be appreciated that exemplary sizes/models/values/ranges may have been given, although embodiments of the present invention are not limited to the same. As manufacturing techniques (e.g., photolithography) mature over time, it is expected that devices of smaller size could be manufactured.

Whereas many alterations and modifications of the embodiment of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A processor comprising
   translation logic to decode an instruction to first micro-operations;
   extraction logic, coupled to the translation logic, to determine first information about numbers of occurrences of one or more fields in the first micro-operations; and
   verification logic, coupled to the extraction logic, to indicate whether decoding results of the instruction are accurate based at least on the first information.

2. The processor of claim 1, wherein the first information comprises a set of numbers, wherein each number is a number of occurrences of a field.

3. The processor of claim 1, further comprising a plurality of counters, each counter is associated with a field, wherein a value stored on the counter increases for each occurrence of the field in the first micro-operations.

4. The processor of claim 1, further comprising a memory to store verification information associated with the instruction, wherein the verification information comprises a set of numbers indicative of occurrences of the one or more fields based on correct decoding results of the instruction.

5. The processor of claim 1, wherein the verification logic is operable
   to generate the first information in conjunction with a hash function; and
   to compare the result of the hash function with verification information.

6. The processor of claim 1, wherein the verification logic resets a plurality of counters when the verification logic detects an indication of a new instruction.

7. The processor of claim 1, wherein each field of the one or more fields is associated with a field identifier.

8. The processor of claim 1, wherein the verification logic is operable to indicate the decoding results of the instruction is correct if verification information associated with the instruction does not exists.

9. The processor of claim 1, further comprising:
   an execution unit to perform operation in response to the first micro-operations; and
   branch prediction logic to generate a direction of a branch operation.

10. A method comprising:
    decoding, by translation logic, an instruction to first micro-operations;
    extracting first information about numbers of occurrences of one or more fields in the first micro-operations; and
    verifying, by verification logic, whether decoding results of the instruction are accurate based at least on the first information.

11. The method of claim 10, wherein the first information comprises a set of numbers, wherein each number is a number of occurrences of a field.

12. The method of claim 10, further comprising increasing a value stored on a counter for each occurrence of a field in the first micro-operations, wherein the counter is associated with the field.

13. The method of claim 10, wherein the verifying comprising comparing the first information to verification information associated with the instruction, wherein the verification information comprises a set of numbers indicative of occurrences of the one or more fields based on correct decoding results of the instruction.

14. The method of claim 10, further comprising:
    generating the first information in conjunction with a hash function; and
    comparing the result of the hash function with verification information.

15. The method of claim 10, further comprising:
    resetting a plurality of counters when the verification logic detects an indication of a new instruction.

16. The method of claim 10, further comprising:
    indicating, by the verification logic, that the decoding results of the instruction is correct if verification information associated with the instruction does not exists.

17. A system for verification of decoding instructions comprising:

an instruction fetch unit to receive instructions from a memory;

translation logic to decode an instruction to first micro-operations;

extraction logic, coupled to the translation logic, to determine first information about numbers of occurrences of one or more fields in the first micro-operations;

verification logic, coupled to the extraction logic, to indicate whether decoding results of the instruction are accurate based at least on the first information; and one or more registers to store errors of the decoding results, wherein the one or more registers are readable by an operating system.

18. The system of claim 17, wherein the first information comprises a set of numbers, wherein each number is a number of occurrences of a field.

19. The system of claim 17, further comprising a plurality of counters, each counter is associated with a field, wherein a value stored on the counter increases for each occurrence of the field in the first micro-operations.

20. The system of claim 17, wherein each field of the one or more fields is associated with a field identifier.

* * * * *